United States Patent
Landow et al.

(10) Patent No.: US 8,880,720 B2
(45) Date of Patent: *Nov. 4, 2014

(54) METHOD AND DEVICE FOR DELIVERING SUPPLEMENTAL CONTENT ASSOCIATED WITH AUDIO/VISUAL CONTENT TO A USER

(71) Applicant: Echostar Technologies L.L.C., Englewood, CO (US)

(72) Inventors: Kate Megan Carney Landow, Denver, CO (US); John A. Card, II, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,231

(22) Filed: Jan. 18, 2013

(65) Prior Publication Data

US 2013/0138781 A1    May 30, 2013

Related U.S. Application Data

(63) Continuation of application No. 12/252,360, filed on Oct. 16, 2008, now Pat. No. 8,359,399.

(51) Int. Cl.
  *G06F 15/16*   (2006.01)
  *G06F 3/048*   (2013.01)
  *H04L 29/08*   (2006.01)

(52) U.S. Cl.
  CPC ............... *H04L 67/02* (2013.01); *G06F 3/048* (2013.01); *G06F 15/16* (2013.01)
  USPC ........... 709/231; 709/201; 709/202; 709/203; 709/204; 709/229

(58) Field of Classification Search
  CPC . H04H 60/74; H04N 21/4884; H04L 12/2838
  USPC .................................. 709/201–204, 229–231
  See application file for complete search history.

(56) References Cited

U.S. PATENT DOCUMENTS

| | | | |
|---|---|---|---|
| 5,506,626 | A | 4/1996 | Yagi et al. |
| 5,537,151 | A | 7/1996 | Orr et al. |
| 5,543,851 | A | 8/1996 | Chang |
| 5,946,046 | A | 8/1999 | You et al. |
| 7,738,834 | B2 | 6/2010 | Rischmueller |
| 2002/0101537 | A1 | 8/2002 | Basson et al. |
| 2003/0229900 | A1 | 12/2003 | Reisman |

(Continued)

OTHER PUBLICATIONS

USPTO "Non-Final Office Action" mailed Jun. 28, 2010 for U.S. Appl. No. 12/252,360, filed Oct. 16, 2008.

(Continued)

*Primary Examiner* — Shirley Zhang
(74) *Attorney, Agent, or Firm* — Ingrassia Fisher & Lorenz, P.C.

(57) ABSTRACT

A method for delivering supplemental content associated with audio/visual content to a user of the audio/visual content is presented. In the method, the audio/visual content and the supplemental content are received. The audio/visual content is then transferred as a stream to a first device for presentation to the user. The supplemental content is transferred to a second device for presentation to the user. The transferred supplemental content is organized into segments, wherein each of the segments is to be presented by the second device to the user in synchronization with the presentation of a corresponding portion of the audio/visual content.

20 Claims, 6 Drawing Sheets

(56) References Cited

U.S. PATENT DOCUMENTS

| | | | |
|---|---|---|---|
| 2005/0038661 A1 | 2/2005 | Momosaki et al. |
| 2005/0246747 A1 | 11/2005 | Braun et al. |
| 2006/0274214 A1 | 12/2006 | Carro |
| 2007/0106516 A1 | 5/2007 | Larson et al. |
| 2007/0130581 A1 | 6/2007 | Del Sesto et al. |
| 2008/0155109 A1 | 6/2008 | Khedouri et al. |
| 2008/0155602 A1 | 6/2008 | Collet et al. |
| 2008/0294434 A1 | 11/2008 | Pettinato |
| 2009/0172720 A1 | 7/2009 | Kiiskinen et al. |
| 2009/0300699 A1 | 12/2009 | Casagrande et al. |
| 2009/0307741 A1 | 12/2009 | Casagrande |
| 2010/0100581 A1 | 4/2010 | Landow et al. |

OTHER PUBLICATIONS

USPTO "Final Office Action" mailed Dec. 10, 2010 for U.S. Appl. No. 12/252,360, filed Oct. 16, 2008.

USPTO "Non-Final Office Action" mailed Aug. 4, 2011 for U.S. Appl. No. 12/252,360, filed Oct. 16, 2008.

USPTO "Final Office Action" mailed Feb. 1, 2012 for U.S. Appl. No. 12/252,360, filed Oct. 16, 2008.

USPTO "Notice of Allowance" mailed Sep. 19, 2012 for U.S. Appl. No. 12/252,360, filed Oct. 16, 2008.

"Captioning at every seat . . . at every showing . . . " "Products" page retrieved from Personal Captioning Systems, Inc.'s internet site located at http://www.personal captioning.com/index_files/prolducts.htm on Jul. 31, 2008.3 pages.

Home Support page retrieved from Personal Captioning Systems, Inc.'s internet site located at http://www.personalcaptioning.com/index_files/support.htm on Jul. 31, 2008, 1 page.

"Real Window Captioning System" retrieved from Wikipedia internet site located at http://en/wikipedia, org/w/index.php?title+Rear_Window_Captioning_System&printable=y . . . on Jul. 31, 2008, 1 page.

"Descriptive Video Services" retrieved from Wikipedia internet site located at http://en.wikipedia.org/w/index.php?title=Descriptive_Video_Service . . . on Jul. 31, 2008, 4 pages.

"DVS Services" retrieved from WGBH's internet site for Media Access Group located at http://main.wgbh.org/wgbh/pages/mag/services/description/ on Oct. 14, 2008, 2 pages.

DVS FAQ retrieved from WGBH's internet site for Media Access Group located at http://main.wgbh.org/wgbh/pages/mag/services/description-dvs-faq.html on Oct. 14, 2008, 2 pages.

"Digital cinema" retrieved from Wikipedia internet site located at http://en.wikipedia.org/w/index.php?title=Digital_cinema&printable=yes on Sep. 12, 2008, 7 pages.

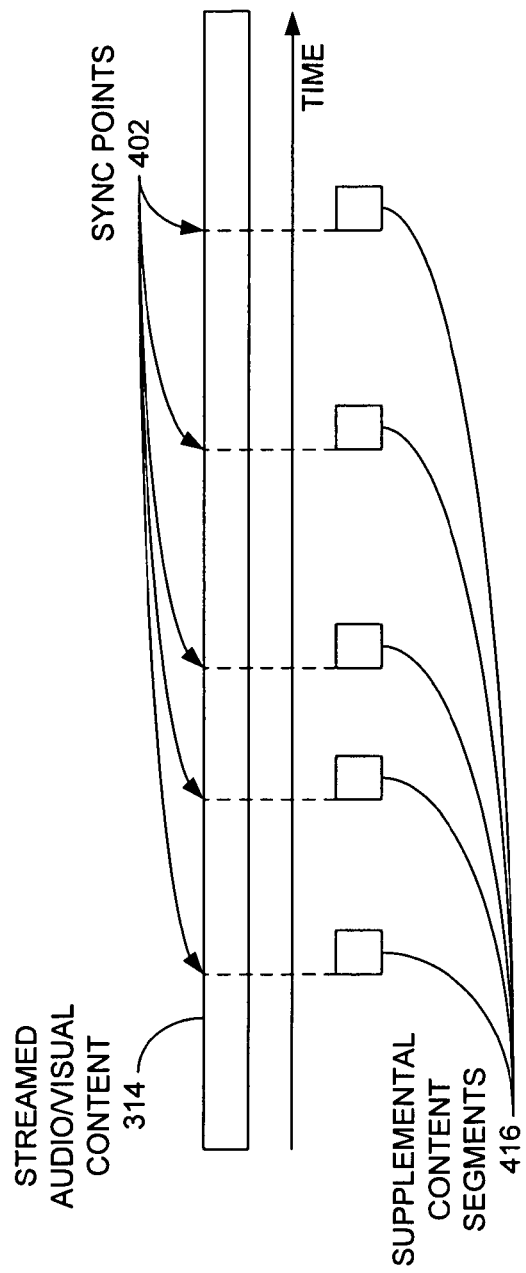

METHOD AND DEVICE FOR DELIVERING SUPPLEMENTAL CONTENT ASSOCIATED WITH AUDIO/VISUAL CONTENT TO A USER

CROSS-REFERENCES TO RELATED APPLICATIONS

This Application claims priority to U.S. Non-Provisional application Ser. No. 12/252,360, filed Oct. 16, 2008.

BACKGROUND

Several technologies have been developed to aid people possessing visual and hearing challenges in the consumption of televised, recorded, and "live" audio/visual content, including movies, news programs, and sporting events. For example, closed captioning, such as the on-screen television captioning provided under one of the standards promulgated by the Electronic Industries Alliance (for example, EIA-608 for standard definition content and EIA-708 for high-definition content) is widely available. This captioning provides dialogue and other textual information representing the audio portion of a television program to those with hearing difficulties. For those users with impaired vision, the Descriptive Video Service® (DVS®) exploits gaps in dialogue in the audio portion of a program to introduce a verbal description of important elements of the visual portion of the presentation.

Implementing similar technologies for more publicly-oriented venues, such as movie theaters, have proven more challenging. For example, "open captioning", in which the captioning is visible on the projection screen to all patrons of the movie, is sometimes available at selected showings of the movie. In another example, the Rear Window® Captioning (RWC) system allows only patrons possessing a reflective surface to view captioning data displayed on a large light-emitting diode (LED) display mounted at the rear of the theater while viewing the movie screen, thus restricting the captioning to those who wish to view it. Other technologies for selectively providing visual or audio assistance to patrons in a public setting are currently being developed and implemented.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIG. 4 is a representation of the timing of transferred supplemental content segments compared to streamed audio/visual content associated with the supplemental content according to an embodiment of the invention.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
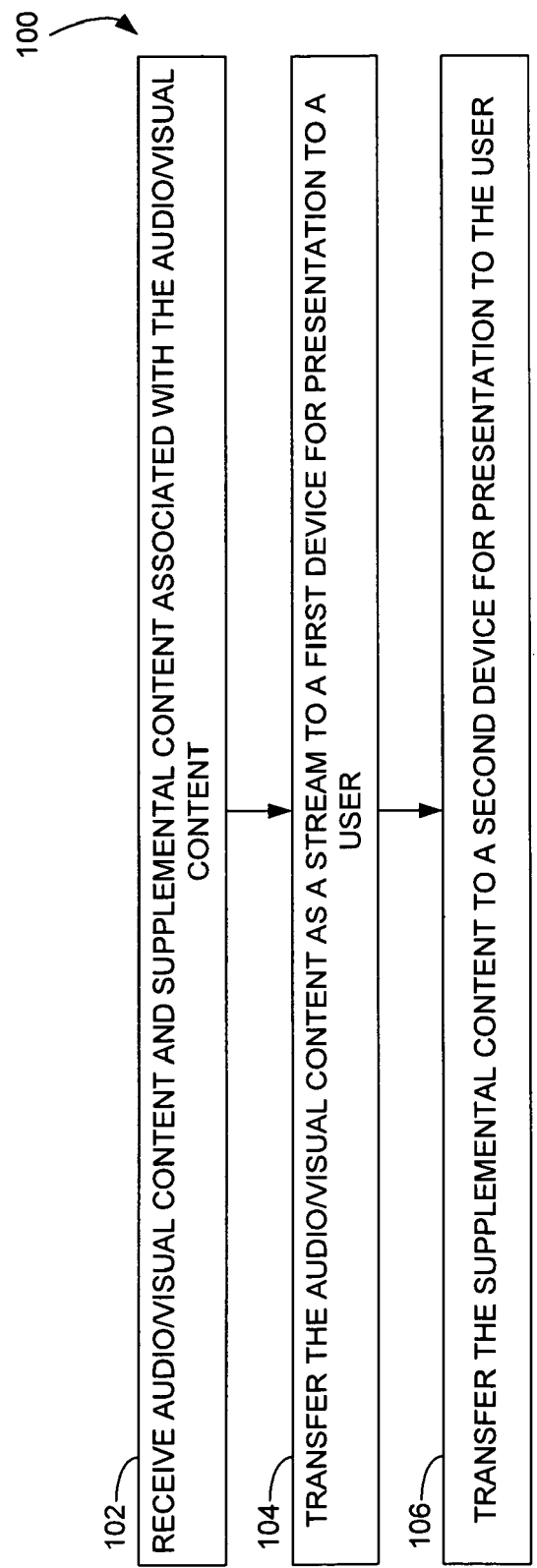
FIG. 1 is a flow diagram of a method according to an embodiment of the invention of delivering supplemental content associated with audio/visual content to a user of the audio/visual content.

FIG. 1 is a flow diagram describing a method 100 according to an embodiment of the invention for delivering supplemental content associated with audio/visual content to a user of the audio/visual content. The audio/visual content may be any type of media content incorporating both audio and visual elements. Examples of the audio/visual content include, but are not limited to, movies, news programs, sporting events, episodic programs, pay-per-view (PPV) events, video-on-demand (VOD) presentations, and the like. The audio/visual content may be broadcast via satellite, cable, or terrestrial ("over-the-air") means, transmitted over a peer-to-peer communication connection, transferred over an Internet Protocol (IP) or other communication network, transferred on removable storage media, or delivered in any other fashion to the user.

Both the audio and visual content may be formatted according to any protocol or standard capable of representing the content. In one example, the audio and visual content may be embedded together in a compressed digital format, such as one of the Motion Picture Experts Group (MPEG) standards, including MPEG-2 and MPEG-4. In another implementation, the audio and visual content may be formatted as separate digital files or entities. Formats involving an analog representation of either or both of the audio and visual content may be involved in other scenarios. The visual content may be formatted as video content in one example. The audio content may be configured into a monaural, stereo, 5.1 stereo, 7.1 stereo, or other audio format. Further, the audio content may include multiple streams of audio content, such as streams for different languages. In addition, each of the multiple streams may be intended to be decoded separately and/or uniquely, simultaneously in combination with each other, or some combination thereof.

The supplemental content may be any content that supplements or is otherwise associated with the audio/visual content to be delivered to the user. For example, the supplemental content may be additional visual content representing at least a portion of the audio content, and/or vice-versa. For example, the supplemental content may be captioning data providing text of dialogue spoken as part of the audio portion of the audio/visual content. The captioning may also provide a visual representation of other elements of the audio content, such graphic symbols representing music or sound effects. In another implementation, the captioning may provide commentary or other analysis of the associated visual and/or visual content. Further, multiple sets of captioning, such as captioning for each of several different languages, may be supplied. Examples of captioning would be captioning that adheres to one of the Electronic Industries Alliance (EIA) standards. These captioning formats include EIA-608, typically used for standard-definition National Television System Committee (NTSC) television broadcasts, and EIA-708, employed in Advanced Television Systems Committee (ATSC) high-definition television broadcasts. Other captioning standards may be involved in other implementations.

Another potential form of supplemental content includes additional descriptive audio content describing at least some portion of the video content. One particular example of this type of audio content is termed Descriptive Video Service® (DVS®), which typically exploits pauses in dialogue within the audio content to insert verbal or other audio descriptions of various elements of the presentation's visual content. In this case, the supplemental content may include descriptions of scene settings, actions and appearance of individuals, and other visual elements.

In another implementation, the supplemental content may include the audio portion of the audio/visual content presented in one or more different languages from that employed in the audio portion of the audio/visual content. In another example, the supplemental content may include all dialogue associated with the audio/visual content in one or more languages, while the audio portion of the audio/visual content may incorporate music, background noises, special audio effects, and the like. Other types of audio-oriented supplemental content may be supplied in other implementations.

The examples of the supplemental content described above essentially reproduce audio content in video form, or vice-versa, to allow users with hearing or sight limitations, or users not familiar with a particular language, to enjoy the audio/visual content more fully. However, the types of supplemental content possible need not be restricted in such a manner. For example, the supplemental content may include audio and/or visual information that is associated with, and yet is not duplicative of, the primary audio/visual content. In one implementation, the supplemental content may be textual, graphical, and/or other visual content providing background information regarding the general subject matter of the primary audio/visual content; information relating to the production of the audio/visual content; statistics and/or related information regarding actors, athletes, and others involved or related to the audio/visual content; critique or analysis of the audio/visual content, or any other information related to the audio/visual content. In another example, this supplemental information may be presented as supplemental audio content, or as both audio and visual content.

In the method 100 of FIG. 1, the audio/visual content and the supplemental content associated with the audio/visual content is received (operation 102). The audio/visual content is transferred as a stream to a first device for presentation to the user (operation 104). The supplemental content is transferred to a second device for presentation to the user (operation 106). The transferred supplemental content is organized into segments, wherein each of the segments is to be presented by the second device to the user in synchronization with a corresponding portion of the audio/visual content. While FIG. 1 indicates a specific order of execution of the operations 102-106, other possible orders of execution, including concurrent execution of one or more operations, may be undertaken in other implementations. In another embodiment, a computer-readable storage medium may have encoded thereon instructions for a processor or other control logic to direct a device to implement the method 100.

Figure 2:
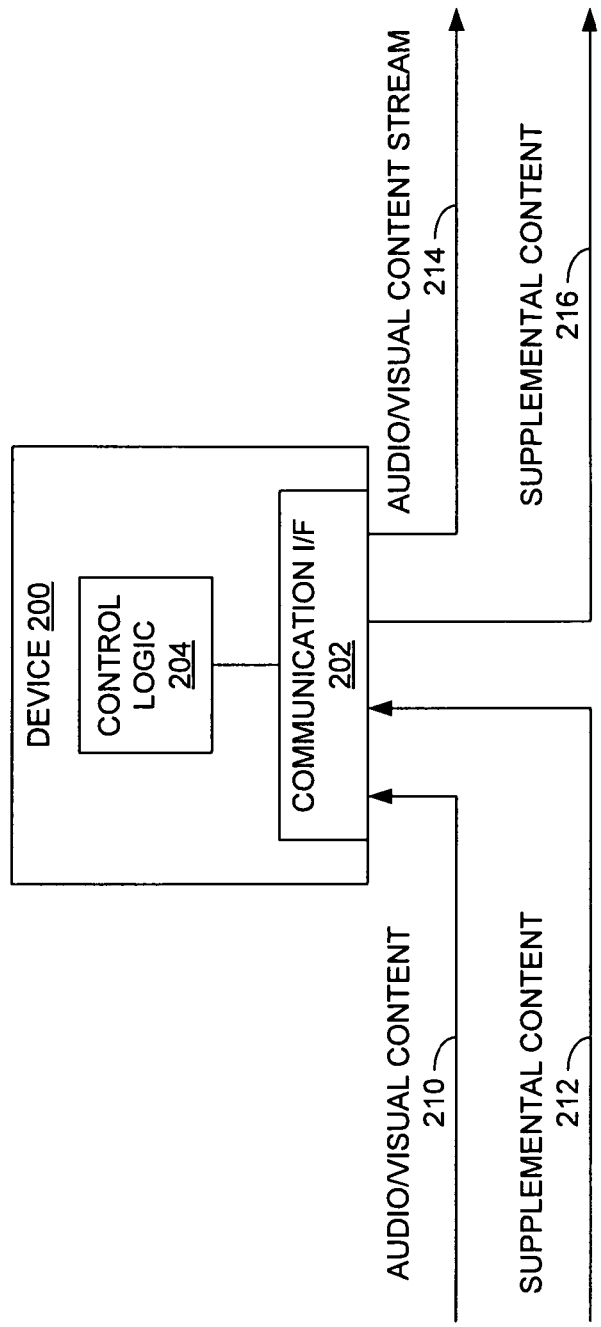
FIG. 2 is a block diagram of a device according to an embodiment of the invention for delivering supplemental content associated with audio/visual content to a user of the audio/visual content.

An example of a device 200 capable of performing the operations of the method 100 is shown in FIG. 2. The device 200 may be any standalone device, or may be incorporated in the form of software, firmware, and/or hardware elements into another device, such as a computer or communication device. The device 200 includes a communication interface 202 and control logic 204. The communication interface 202 is configured to receive audio/visual content 210, as well as supplemental content 212 associated with the audio/visual content 210. The communication interface 202 is also configured to transfer the audio/visual content as a stream 214 of the audio/video content 210 to a first device (not shown in FIG. 2), and to transfer the supplemental content 212 as supplemental content 216 to a second device (also not shown in FIG. 2). The control logic 204 of the device 200 is configured to organize the incoming supplemental content 212 into individual segments (if necessary), wherein each of the segments is to be presented to the user by way of the second device to the user in synchronization with a corresponding portion of the audio/visual content stream 214 being presented to the user via the first device. In one example, the communication interface 202 may include a number of separate interfaces for one or more of the audio/visual content 210, the incoming supplemental content 212, the audio/visual content stream 214, and the outgoing supplemental content 216.

Figure 3:
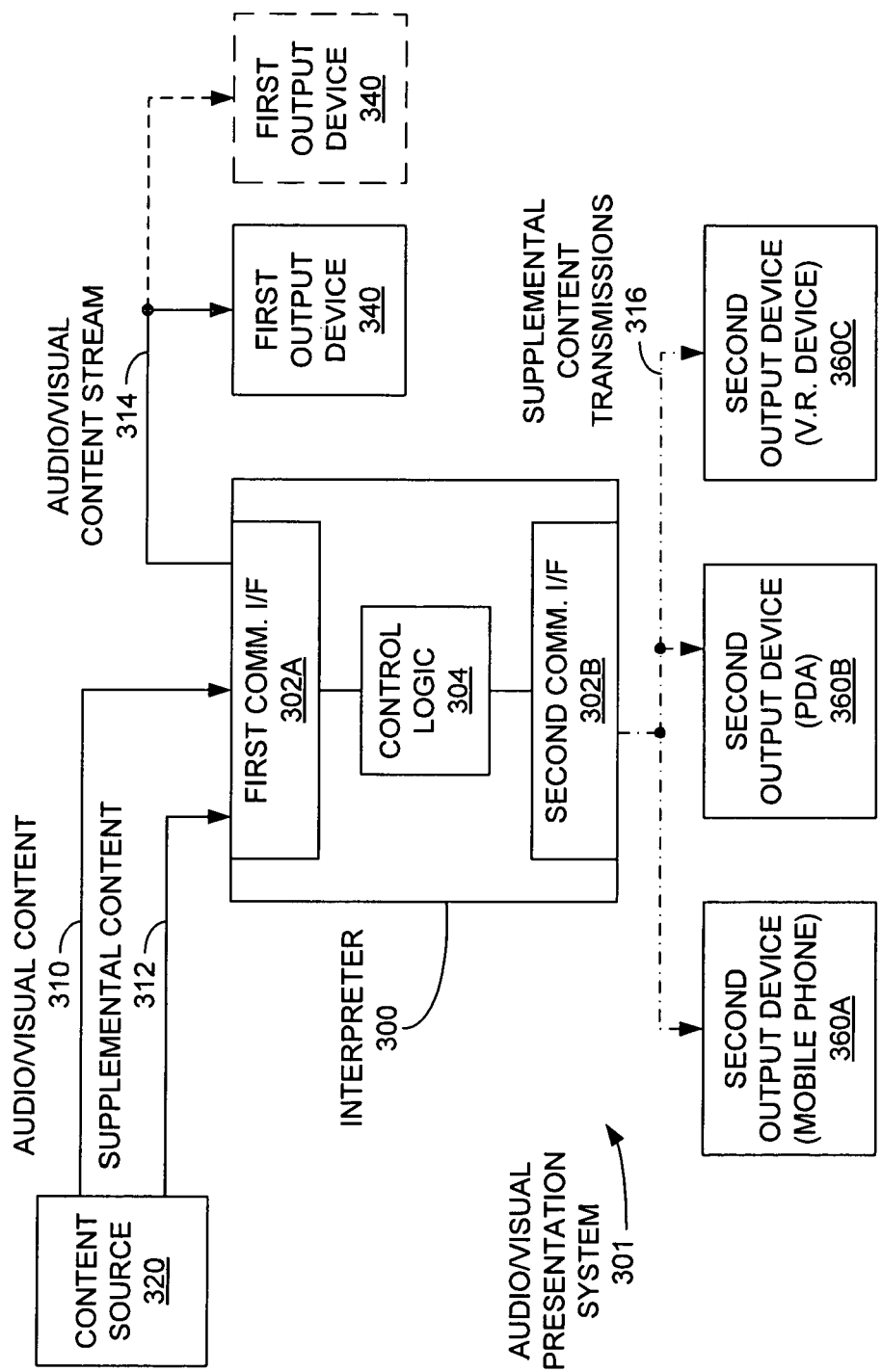
FIG. 3 is a block diagram of a system according to an embodiment of the invention for delivering supplemental content associated with audio/visual content to users of the audio/visual content.

Another implementation of the invention, labeled an interpreter 300, is presented in FIG. 3 within the context of an audio/visual presentation system 301. In addition to the interpreter 300, the presentation system 301 includes a content source 320, at least one first output device 340, and a number of second output devices 360. Other components, such as intermediate communication devices, including communication switches, routers, transponders, and the like, inter-coupling the devices mentioned above, may also be included in the presentation system 301, but are not depicted in FIG. 3 nor discussed herein to simplify and facilitate the following discussion.

The content source 320 may be any device that transmits or communicates audio/visual content 310 and supplemental content 312 associated with the audio/visual content 310 to the interpreter 300. The audio/visual content 310 and the supplemental content 312 may be at least any of the types or forms of content discussed above in conjunction with FIG. 1. In one example, the content source 320 may constitute part of a broadcast transmission system configured to transmit the content 310, 312 to the interpreter 300. Examples of such a broadcast transmission system include, but are not limited to, a satellite television receiver, a cable television receiver, and a terrestrial (over-the-air) television receiver. In another implementation, the content source 320 may be a communication device, such as a computer or network server, capable of transmitting and/or receiving content over a communication network, such as an IP-based network. In another embodiment, the content source 320 may be a data storage medium, such as a digital video disc (DVD), having encoded thereon both the audio/visual content 310 and the associated supplemental content 312.

Depending on the environment in which the presentation system 301 is deployed, the content source 320 may located within the same device enclosure as the interpreter 300, within the same building as the interpreter 300, or at some extended distance from the interpreter 300. Thus, the content source 320 may transfer the audio/visual content 310 and the supplemental content 312 to the interpreter 300 over any of the number of interfaces, such as an internal bus, a short-range interface, a local area network (LAN), a wide area network (WAN) (such as the Internet), or any other wired or wireless interface.

The first output device 340 may be any device or system configured to receive streaming audio/visual content 314 received from the interpreter 300, and to present the content 314 to one or more users. In one implementation, the first output device 340 may be a theater projection system including a projector and a viewing screen for presenting the visual portion of the audio/visual content 314, and an audio system for presenting the audio portion of the content 314 to the audience. In one particular arrangement, the first output device 340 may be a digital cinema system capable of receiving and processing the streaming content 314 in a completely digital format for presentation to the users. Additionally, the content source 320 may be included in such a digital cinema system. Embodiments of this type may be suitable for a large viewing area in which the first output device 340 presents the streaming audio/visual content 314 to a number of users.

In another implementation, the first output device 340 may include a television, video monitor, or similar device capable of presenting the streaming audio/visual content 314 to one or more users. In one context, multiple first output devices 340, as shown in FIG. 3, may be employed to provide multiple streams of content 314 simultaneously, with one or more users being associated with each of the streams 314. For example, multiple televisions or video monitors are often located in a sports bar or similar establishment for presentation of several sporting events simultaneously. In that environment, the content source 320 may include one or more television receivers configured to provide a plurality of streams 314 for the user's enjoyment.

In another example, each of multiple guest rooms in a hotel may include a television serving as a first output device 340 of FIG. 3. Under that scenario, each of the first output devices 340 may present live broadcast events, video-on-demand (VOD) programming, and other audio/visual content 314, as selected by one or more users. Under that scenario, the content source 320 may be implemented as a broadcast receiver coupled with a VOD server. Other types of first output devices 340 may be employed in other presentation system 301 arrangements.

Each of the second output devices 360 are configured to receive the supplemental content 316 from the interpreter 300 and present that content 316 to a user associated with the second output device 360. Each of the second output devices 360 may be any type of device capable of this functionality. Three such devices are depicted in FIG. 3: a mobile phone 360A, a personal digital assistant (PDA) 360B, and a virtual reality device 360C, each of which is a mobile device. However, any other communication device capable of receiving the supplemental content 316 and presenting the content 316 to a user may be employed in other implementations. More specifically, if the supplemental content 316 contains only audio content, the second output device 360 need only be capable of presenting the audio content; similarly, visual-only supplemental content 316 may be supplied to the user via a second output device 360 capable of presenting only visual information.

Only a few of the possible environments and associated devices for the presentation system 301 are noted above; many others are possible. For example, various combinations of the content source 320, the first output devices 340, and the second output devices 360 listed above may be combined to form alternative presentation systems 301.

As shown in FIG. 3, the interpreter 300 includes a communication interface 302 composed of a first communication interface 302A and a second communication interface 302B. The first communication interface 302A is configured to receive the audio/visual content 310 and the associated supplemental content 312 from the content source 320, and to transfer the audio/visual content stream 314 to the first output device 340. In one example, the first communication interface 301A is a wired IP interface, such as one based on an Ethernet connection. However, any wired or wireless interface may serve as the first communication interface 302A in other implementations.

Also, in other implementations, the first communication interface 302A may incorporate at least two separate interfaces: one for the receipt of the audio/visual content 310 and associated supplemental content 312, and another for transfer of the audio/visual content stream 314 to the first output device 340. For example, the audio/visual content 310 and supplemental content 312 may be received by way of an input composite video interface, component video interface, modulated RF cable interface, High Definition Multimedia Interface (HDMI), and the like, possibly along with a separate audio output interface. Similarly, an output interface of any of these types, or another type not mentioned above, may carry the audio/visual content stream 314 to the first output device 340.

The second communication interface 302B of the interpreter 300 is utilized to transfer supplemental content transmissions 316 to the second output devices 302B. In one embodiment, the second communication interface 302B is a wireless communication interface, such as a Bluetooth® short-range wireless interface. Other potential wireless varieties of the second communication interface 302B include Institute of Electrical and Electronics Engineers (IEEE) wireless LAN standards, such as IEEE 802.11a, 802.11b, 802.11g, and 802.11n, oftentimes collectively referred to as Wireless Fidelity, or "Wi-Fi". Such wireless connections are particularly well-suited for communicating with the second output devices 360, which may be mobile devices. Other wireless communication standards, as well as many wired communication protocols, that are capable of transmitting the synchronized supplemental content 316, may be utilized by the second communication interface 302B in other versions of the interpreter 300.

The control logic 304 of the interpreter 300 may include any control circuitry capable of performing the various tasks described below. For example, the control logic 304 may be a processor, such as a microprocessor, microcontroller, or digital signal processor (DSP), configured to execute instructions directing the processor to perform the functions discussed in detail below. In another implementation, the control logic 304 may be hardware-based logic, or may include a combination of hardware, firmware, and/or software elements.

In many implementations, the supplemental content 312 received by the interpreter 300 is less voluminous than the audio/visual content 310 associated therewith. For example, the amount of captioning data, such as EIA-608 or EIA-708 captioning data, associated with a program is typically much less than the amount of data related to the audio and visual elements of the program itself. Furthermore, the supplemental content 312 normally consists of identifiable portions, or "segments", with each segment intended to be presented to the user at the same time a corresponding portion of the audio/visual content 310 is being presented. For example, captioning data representing a section of dialogue is typically displayed at approximately the time the portion of the audio/visual content 310 containing the dialogue is being presented to reduce any potential confusion of the user. At least some of the embodiments of the invention described herein are adapted to maintain proper synchronization between the audio/visual content 314 and the supplemental content 316 when presented to the user.

To this end, in one implementation, the control logic 304 of the interpreter 300 may be configured to organize the supplemental content 312 received from the content source 320 via the first communication interface 302A into individual segments, and to synchronize the transfer of each of these segments through the second communication interface 302B as the supplemental content 316 to the second output devices 360. FIG. 4 provides a graphic representation of the audio/visual content 314 as streamed over time compared to individual transferred segments 416 of the supplemental content 316 transmitted to each of the second output devices 360. In one implementation, each of the supplemental content segments 416 may be transmitted as a short data transfer timed with a particular synchronization point 402 of the audio/visual content stream 314.

In another embodiment, the control logic 304 may organize the supplemental content 312 into one or more transmissions 316 not necessarily aligning with the segments of the supplemental content 312. Such transmissions 316 may occur concurrently with or prior to the transfer of the audio/visual content stream 314 to the first output device 340. Under this scenario, the control logic 304 may also generate a synchronization signal or message (not shown in FIG. 3) for transmission to each of the second output devices 360. Each second output device 360 may then utilize each received synchronization signal to synchronize the presentation of at least one of the segments of the transferred supplemental content 316 with the presentation of its corresponding portion of the audio/visual content stream 314. In addition, the synchronization signal may include an indication of the particular segment of the supplemental content 316 to be displayed, additional supplemental content, and other data described in greater detail below.

Figure 5A:
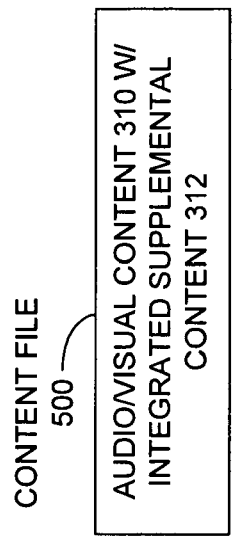
FIG. 5A is a representation of a content file containing audio/visual and integrated supplemental content according to an embodiment of the invention.
Figure 5B:
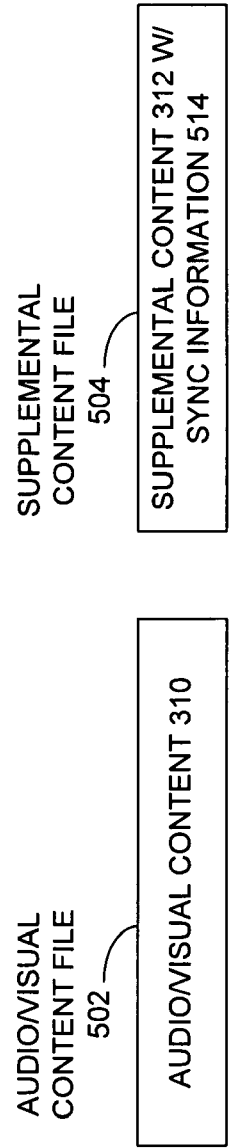
FIG. 5B is a representation of separate audio/visual and supplemental content files according to an embodiment of the invention.

The audio/visual content 310 and the associated supplemental content 312 received at the first communication interface 302A may be organized in several ways, two of which are depicted in FIGS. 5A and 5B. In FIG. 5A, the supplemental content 312 is integrated with the audio/visual content 310 in a combined content file 500. The content source 320 may stream the content file 500 to the first communication interface 302A in real-time in one implementation. In another example, the content source 320 partially or completely transfers the content file 500 to the first communication interface 302A before the control logic 304 initiates the transfer of the audio/visual content stream 514 and the supplemental content segments 516 via the second communication interface 302A. As a result, the control logic 304 may buffer at least a portion of the content file 500 in a memory (not shown in FIG. 3) located within in, or coupled to, the interpreter 300.

With the content file 500 integrating the supplemental content 312 with its corresponding audio/visual content 310, synchronization of the supplemental content 312 with the audio/visual content 310 may be presumed from the temporal relationship between the two types of content 310, 312. For example, in an MPEG-2 audio/video data file or stream, captioning data supplied with the audio/data is presented in data packets along with the audio/video data, thus providing the necessary synchronization between the audio/video data and the captioning data. As a result, no additional synchronization data is required. As a result, the control logic 304 may take each identifiable portion of the supplemental content 312, such as captioning data associated with a particular sequence of video images, and cause that portion to be transferred as an individual segment 314 over the second communication interface 302B at least approximately simultaneously with the corresponding portion of the audio/visual content 314 being streamed over the first communication interface 302A.

In the embodiment of FIG. 5B, the content source 320 may transfer the audio/visual content 320 to the first communication interface 302A of the interpreter 300 in an audio/video content file or stream 502 separate from the supplemental content 312, which could be transferred to the first communication interface 302A in its own supplemental content file 504. While FIG. 3 depicts the content source 320 delivering the supplemental content 312, another source device or system not shown in FIG. 3 may transfer the supplemental content file 504.

Since the supplemental content file 504 is delivered separately from its associated audio/visual content file 502, any implied synchronization between the audio/visual content 310 and the supplemental content 312 may be lost. As a result, in one implementation, the supplemental content file 504 may contain synchronization data 514 associating various portions of the supplemental content 312 with corresponding portions of the audio/visual content 310. In one example, the synchronization data may include timestamps, video frame numbers, or other markers relating each portion of the supplemental content 312 with its matching audio/visual content 310 synchronization point 402 shown in FIG. 4. In other embodiments, the synchronization data 514 may not be included within the supplemental content file 504, but instead may reside within a separate file. Such synchronization data 314 may then relate each identifiable segment of the supplemental content 312 with its corresponding portion of the audio/visual content 310.

The transmitted supplemental content 316, whether transmitted as individual segments 314, or as one or more larger portions, may be transferred to the second output devices 360 using any of a number of techniques. For example, each supplemental content transmission 316 may be broadcast, wherein the second communication interface 302B transfers each transmission 316 once, and the second output devices 360 configured to receive the supplemental content transmission 316 would receive the same transmission 316 at the same time. In another example, the second communication interface 302B may rely on a multicasting scheme, wherein the second communication interface 302B transfers each transmission 316 to less than all of the second output devices 360, at least one of which transfers the transmission 316 it has received to another of the second output devices 360. One possible multicasting scheme that may be employed is the IP Multicast protocol often utilized in IP communication networks.

As mentioned earlier, each of the supplemental content transmissions 316 is typically small in size, given the relatively sparse nature of the supplemental content 316 compared to the associated audio/visual content stream 314. Given that, each of the transmissions 316 may be transmitted to the second output devices 360 as a "thin" feed or "web" feed, an example of which would be an RSS (Really Simple Syndication) feed. RSS is often employed as a means of web syndication, whereby a user may subscribe to, and receive periodic updates from, news sources, weblogs ("blogs"), podcast cites, and the like provided on a website. This same protocol may be employed to transfer each supplemental content transmission 316 to the second output devices 360 in one implementation.

In one example of a web feed, each of the second output devices 360 may "subscribe" to the interpreter 300 to receive the transmissions 316. This subscription may be exceptionally useful in the case the interpreter 300 makes available multiple types of supplemental content 316, each associated with a different set of audio/visual content 314. For instance, the interpreter 300 may receive and provide several different sporting events, such as football games, in a sports bar environment. A user of one of the second output devices 360 may then subscribe to a particular game of interest, allowing the second output device 360 to receive the supplemental content 316 for that game. In another embodiment, the second output device 360 may receive all supplemental content 316 available, and then allow the user to select a particular set of supplemental content 316 associated with a specific game for presentation to the user.

Figure 6:
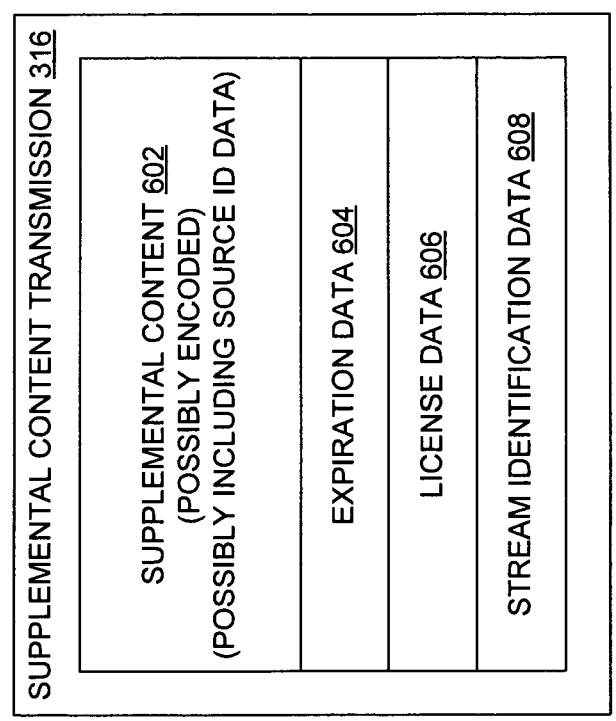
FIG. 6 is a representation of a supplemental content transmission according to an embodiment of the invention.

FIG. 6 provides an embodiment of the possible types of data included in a supplement content transmission 316, which may be embodied as a small web feed or file in one example. As described above, each supplemental content transmission 316 may be an individual segment of the supplemental content 312, or may constitute any portion of the supplemental content 312, including all of the supplemental content 312 associated with a particular program or event. The transmission 316 includes the actual supplemental content 602 to be presented to the user via the second output device 360. Depending on the implementation, the supplemental content transmission 316 may also include expiration data 604, license data 606, and/or stream identification data 610. Other types of data may also be included in the supplemental content transmission 316 without departing from the scope of the invention.

The included supplemental content 602 may be formatted according to any data format or standard employable by the second output devices 360 for presentation of the content 602 to the user. For example, in the case of captioning, the supplemental content 602 may be formatted according to at least a portion of the EIA-608 or EIA-708 standard mentioned above. In another example, the captioning may merely include American Standard Code for Information Interchange (ASCII) text for the content 602. If, instead, the supplemental content 602 is audio data, a short audio-file, such as a waveform (WAV) file, may represent the content 602.

To promote security of the supplemental content 602, especially in the case of wireless transmission of the content 602 from the second communication interface 602B to the second output device 360, the control logic 304 of the interpreter 300 may encode the content 602, such as by way of a security key. Accordingly, the second output device 360 may employ the security key, or a complementary version of that key, to decode the encoded content 602 prior to presenting the content 602 to the user.

Access by the second output device 360 to a decoding key to decode the encoded supplemental content 602 may be determined in part by the particular environment in which the second output device 360 is deployed. For example, in the case of a movie theater, the second output device 360 may be rented or loaned to patrons of the theater, thus allowing the second output device 360 to be preprogrammed with the decoding key. In other embodiments, the decoding key may be provided to the user of the second output device 360 upon payment of a ticket to view the movie.

Other security measures may be incorporated into the supplemental content transmission 316 in other arrangements. For example, the supplemental content transmission 316 may include source identification data that indicates the source, such as the copyright holder, of the supplemental content 602. In one embodiment, the source identification data may take the form of a "digital fingerprint", which may be unique data, typically text, embedded within the content 602 identifying the source of the content 602. Ideally, the digital fingerprint data is of sufficient uniqueness that it may be associated only with the source of the content 602, as opposed to other digital fingerprints or content generally available.

Another possible form of source identification data similar to a digital fingerprint is a "digital watermark", which is unique source identification data normally embedded into still images, audio, or video communicated over a network. In the context of the embodiments described herein, a watermark may be embedded into the supplemental content 602 of each transmission 316 transferred to the second output device 360. Thus, if the content 602 is captured by an unauthorized device and subsequently published, the source of the stolen content 602 may be identified via the watermark. The watermark may either be "visible", by which the watermark is readily apparent to all users, or "invisible", in which case the watermark remains embedded in the content 602, but is discernible only by analyzing the actual data at a more detailed level. Invisible watermarks are often employed in digital copyright protection systems to prevent the watermark from affecting the enjoyment of the content while allowing copyright protection systems to prevent unauthorized copying of the watermarked material.

To further enhance the security of the supplemental content transmission 316 against receipt by those devices not authorized to receive the transmission 316, the transmission 316 may be associated with an expiration time, signified by the expiration data 604 included in the transmission 316, as shown in FIG. 6. In one implementation, the expiration data 604 indicates that the recipient's rights to the file expire shortly after the transmission 316 has been received at the second output device 360, thus preventing the device 360 from caching or saving the transmission 316 for later access. Further, when used in conjunction with security encoding of the supplemental content 602, expiration of the transmission 316 can be set so that those devices potentially receiving the transmission 316 without a decoding key would not be able to decode the content 602 until after allowable access to the transmission 316 has expired.

In addition to the expiration data 604, the supplemental content transmission 316 may include license data 606 that enables the receiving second output device 360 to decode the enclosed supplemental content 602 within the time period indicated by the expiration data 604.

As discussed above, multiple audio/visual content streams 314, each identified with its respective set of supplemental content transmissions 316, may be available in a particular environment, such as in a hotel room or sport bar, due to a number of audio/visual presentations being available at any particular time. However, since a user is typically interested in only one content stream 314 at any one time, the second output device 360 may be configured to display only the supplemental content transmissions 316 associated with the audio/visual content stream 314 selected by the user. Thus, each of the supplemental content transmissions 316 may include stream identification data 608 identifying the supplemental content 602 with a particular audio/visual content stream 314. In one example, the stream identification data 608 may include textual data indicating a title or other identifying set of user-readable characters that may be displayed to the user on the second output device 360 to identify the audio/visual content stream 314 associated with the supplemental content transmission 316. In other implementations, any set of alphanumeric characters or other data may be employed to allow the second output device 360 to identify the audio/visual content stream 314 associated with each received transmission 316, and present only the content 602 of those transmissions 316 of interest to the user.

In one embodiment, at least one synchronization signal or message possibly transmitted by the interpreter 300 to the second output devices 360, as described above, may include at least one of the expiration data 604, license data 606, and stream identification data 608 of FIG. 6, along with any additional supplemental content, segment identification data, and/or security key data.

Various embodiments as described herein for delivering supplemental content, such as captioning data, descriptive audio, or other information associated in some way with specific audio/visual content, may provide a number of benefits. In general, the supplemental content may be targeted to only those specific users of the audio/visual content interested in receiving the supplemental content. Also, the supplemental content is delivered to the user to promote synchronization of the supplemental content with its related audio/visual content, thus enhancing the user's enjoyment of the audio/visual content without introducing any undue confusion. Furthermore, the supplemental content may be distributed to the users in a secure manner by implementing one or more of the security techniques described above.

While several embodiments of the invention have been discussed herein, other embodiments encompassed by the scope of the invention are possible. For example, while various embodiments have been described primarily within the context of movie theaters, hotel rooms, sports bars, and the like, public conferences, corporate meetings, church gatherings, or any other setting in which multiple users may be gathered to view or otherwise receive audio/visual content may benefit from application of the various concepts described herein. For example, in some implementations the audio/visual content may take the form of an artistic performance, sporting event, classroom presentation, or similar "live" content being presented directly to the user without the use of a presentation device, while the supplemental content is delivered to the user by way of a media player or similar apparatus according to the concepts described above. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of delivering supplemental content associated with audio/visual content to a plurality of users of the audio/visual content, the method comprising:
   receiving a media stream at an interpreter device, wherein the media stream comprises both the audio/visual content and the supplemental content associated with the audio/video content, wherein the supplemental content is integrated with the audio/visual content in the media stream and wherein the supplemental content has a temporal relationship with the audio/visual content;
   providing the audio/visual content from the interpreter device to a first output device for presentation to the plurality of users; and
   broadcasting the supplemental content received in the media stream from the interpreter device to each of a plurality of second output devices that are separate from the first output device and that are each associated with at least one of the plurality of users;
   wherein the broadcast supplemental content is organized into segments that preserve the temporal relationship between the audio/visual content received in the media stream and the supplemental content received in the media stream such that each of the segments is broadcast to each of the second output devices for simultaneous presentation to each of the users associated with the second output devices in time synchronization with the simultaneous presentation of a corresponding portion of the audio/visual content by the first output device to the user.

2. The method of claim 1, further comprising:
for each of the segments of the supplemental content, broadcasting a synchronization signal to synchronize the presentation of the segment with the presentation of the corresponding portion of the audio/visual content.

3. The method of claim 2, further comprising:
for each of the synchronization signals, transferring to at least one of the second output devices at least one of license data for the segment associated with the synchronization signal and a security key for the segment associated with the synchronization signal.

4. The method of claim 1, wherein:
broadcasting the supplemental content comprises transferring each of the segments of the supplemental content separately, wherein the transfer of each of the segments is synchronized with the presentation of a corresponding portion of the audio/visual content by the first output device.

5. The method of claim 1, wherein:
the supplemental content comprises at least one of captioning content, descriptive audio content, and dialogue in at least one language.

6. The method of claim 1, wherein:
the supplemental content is integrated with the audio/visual content as received, wherein each portion of the supplemental content is received contemporaneously with a corresponding portion of the audio/visual content; and
each segment of the broadcast supplemental content is synchronized with the audio/visual content by way of broadcasting each portion of the supplemental content as a separate segment when the corresponding portion of the audio/visual content is transferred to the first output device.

7. The method of claim 1, further comprising maintaining proper time synchronization between presentation of the audio/visual content presented on the first output device and the supplemental content presented on each of the second output devices.

8. The method of claim 1, wherein:
broadcasting the supplemental content comprises transferring the supplemental content by way of a multicasting protocol to the second device.

9. The method of claim 1, wherein:
broadcasting the audio/visual content comprises transferring the audio/visual content by way of an Internet Protocol connection.

10. The method of claim 1, wherein:
broadcasting the supplemental content comprises transferring the supplemental content by way of an Internet Protocol connection.

11. The method of claim 1, wherein:
broadcasting the supplemental content comprises transferring at least a portion of the supplemental content as a web feed.

12. The method of claim 1, further comprising:
encoding at least a portion of the supplemental content with a security key prior to broadcasting the portion of the supplemental content.

13. The method of claim 1, further comprising:
transferring an expiration time beyond which at least a portion of the supplemental content may no longer be accessed.

14. The method of claim 13, further comprising:
broadcasting license data enabling the second output devices to decode at least a portion of the supplemental content prior to the expiration time.

15. The method of claim 1, further comprising:
broadcasting data identifying a source of the supplemental content prior to broadcasting the supplemental content.

16. A device for delivering supplemental content associated with audio/visual content to a plurality of users of the audio/visual content, the device comprising:
a communication interface configured to receive a media stream comprising the audio/visual content and the supplemental content associated with the audio/video content; and
control logic comprising hardware configured to transfer the audio/visual content received as part of the media stream as a stream to a first output device for presentation to the plurality of users, to organize the supplemental content received as part of the media stream into segments, to broadcast the segments of the supplemental content to each of a plurality of second output devices for tune synchronized presentation to each of the plurality of users, wherein each of the plurality of second output devices is separate from the first output device, and to maintain proper time synchronization between presentation of the audio/visual content presented on the first output device and the supplemental content presented on each of the second output devices.

17. The device of claim 16, wherein:
the control logic is configured to separate the supplemental content in the media stream from the audio/visual content in the media stream as received over the communication interface.

18. The device of claim 16, wherein the communication interface comprises:
a first communication interface configured to receive the audio/visual content and to transfer the audio/visual content to the first output device; and
a second communication interface configured to transfer the supplemental content to the second output device, wherein the second communication interface comprises a wireless communication interface.

19. The device of claim 16, wherein:
the control logic is configured to format each of the segments of the supplemental content as a separate transmission before transferring the supplemental content by way of the communication interface.

20. The device of claim 16, wherein:
for each of the segments of the supplemental content, the control logic is configured to generate a synchronization signal for transmission by way of the communication interface to the second output device to synchronize the presentation of the segment to the user with the presentation of the corresponding portion of the audio/visual content.

* * * * *